(12) United States Patent
Park et al.

(10) Patent No.: US 9,426,042 B2
(45) Date of Patent: Aug. 23, 2016

(54) METHOD AND APPARATUS FOR MEASURING AND MANAGING END-TO-END SERVICE LEVEL AGREEMENT IN NETWORK HAVING ENTITIES OF DIFFERENT MOBILE COMMUNICATION NETWORKS

(71) Applicant: Samsung Electronics Co., Ltd., Suwon-si, Gyeonggi-do (KR)

(72) Inventors: Ki-Beom Park, Hwaseong-si (KR);
Byeong-Soo Yeon, Suwon-si (KR);
Seong-Ha Kim, Yongin-si (KR);
Min-Suk Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 268 days.

(21) Appl. No.: 14/064,578

(22) Filed: Oct. 28, 2013

(65) Prior Publication Data

US 2014/0119221 A1    May 1, 2014

(30) Foreign Application Priority Data

Oct. 26, 2012    (KR) .................. 10-2012-0119850

(51) Int. Cl.
*H04L 12/26*    (2006.01)
*H04L 12/24*    (2006.01)

(52) U.S. Cl.
CPC ............ *H04L 41/5038* (2013.01); *H04L 43/16* (2013.01)

(58) Field of Classification Search
CPC ........................................ H04L 43/16
USPC ........................................ 370/252
See application file for complete search history.

(56) References Cited

U.S. PATENT DOCUMENTS

| | | | |
|---|---|---|---|
| 2011/0222431 A1* | 9/2011 | Oue ............. | H04L 43/0888 370/252 |
| 2012/0128000 A1* | 5/2012 | Baillargeon ........ | H04L 43/10 370/392 |
| 2014/0112148 A1* | 4/2014 | Flinta ............. | H04L 43/087 370/235.1 |

FOREIGN PATENT DOCUMENTS

KR    2012-0093548 A    8/2012

* cited by examiner

*Primary Examiner* — Mark Rinehart
*Assistant Examiner* — Matthew Hopkins
(74) *Attorney, Agent, or Firm* — Jefferson IP Law, LLP

(57) ABSTRACT

A method for measuring an end-to-end Service Level Agreement (SLA) in a network having entities of different mobile communication networks is provided. The method includes sending a server a test condition for SLA measurement, sending the server a test packet, obtaining from a test result received from the server parameter values for metrics included in the test condition, generating analysis data based on the test condition, and sending the analysis data to a manager unit for the entities based on the test condition.

20 Claims, 15 Drawing Sheets

| TEST CONDITION FOR SLA MEASUREMENT | CONDITION CLASSIFICATION |
|---|---|
| TEST PACKET SCHEDULING | PERIODIC TEST PACKET INSERTION |
| | PERIODIC TEST PACKET INSERTION |
| SIZE | SIZE OF TEST PACKET |
| COUNT | TEST PACKET COUNT |
| DESIRED BANDWIDTH | PPS (PACKET PER SECOND) |
| | BPS (BITS PER SECOND) |
| TIME | TEST DURATION |
| | TEST TIMEOUT |
| | DELAY START |
| FLOW CONFIGURATION | TEST FLOW CONFIGURATION |
| QOS (QUALITY OF SERVICE) | DSCP MARKING (CONTROL) |
| | DSCP MARKING (TEST) |
| DATA FILE | SAVE PER PACKET DATA |
| SECURITY | AUTHENTICATION |
| | ENCRYPTION |
| PERIODIC ANALYSIS | SUPPORT PERIODIC ANALYSIS |
| LOG ARCHIVE | SAVE LOG |
| | EXCEL EXPORT |

FIG.4

| CATEGORY | SLA METRIC (METRIC) |
|---|---|
| COUNT | Packets (Tx/Rx) : Delta |
| | Bytes (Tx/Rx) : Delta |
| | Packets (Tx/Rx) : Sum |
| | Bytes (Tx/Rx) : Sum |
| BANDWIDTH | Throughput (Tx/Rx) (BPS, Delta) |
| | Throughput (Tx/Rx) (PPS, Delta) |
| | Throughput (Tx/Rx) (BPS, Sum) |
| | Throughput (Tx/Rx) (PPS, Sum) |
| TIMESTAMP | Delay (Two-way) (Delta) |
| | Delay (Two-way) (Sum) |
| | Delay (One-way) (Sum) |
| | Jitter (Two-way, RTP based) (Delta) |
| | Jitter (Two-way, RTP based) (Sum) |
| | Jitter (One-way, RTP based) (Sum) |
| | Jitter (Two-way, Statistical) |
| ERROR | Loss (Delta) |
| | Loss (Sum) |
| | Loss Ratio (Delta) |
| | Loss Ratio (Sum) |
| | Reordering |
| | Duplicate |
| | TTL |
| | Symmetic PATH |
| SLA | Voice Quality (MOS) |
| | Voice Quality (R-Factor) |
| | Availability |
| | Connectivity |

FIG.5A

| CATEGORY | SLA METRIC (METRIC) |
|---|---|
| ALARM | LOSS |
| | LOSS RATIO |
| | THROUGHPUT |
| | DELAY |
| | JITTER |
| | MOS |
| | CONNECTIVITY |
| | AVAILABILITY |

Seq Interval: 5 sec (1401)
Loop Interval: 300 sec (1402)
Loop Remaining: 294 sec (1403)

| (1404) SEQ | (1405) FLOW | (1406) INTERATION | (1407) IP_ADDRESS | (1408) DSCP | (1409) SIZE | (1410) DURATION | (1411) TEST | (1412) LOSS | (1413) DELAY | (1414) JITTER | (1415) BANDWIDTH | (1416) STAT | (1417) LOG |
|---|---|---|---|---|---|---|---|---|---|---|---|---|---|
| *1 | 0 | [ 4/ 10] | 10.10.10.1 | 46 | 1000 | 80.0 | [ 375/1000] | 1 | 0.293 | 0.004 | 997.333k | T | N |
| 2 | 1 | [ 3/ 10] | 20.20.20.1 | 0 | 1500 | 10.0 | [ 833/ 833] | 0 | 0.426 | 0.003 | 999.999k | S | Y |
| 3 | 2 | [ 3/ 10] | 30.30.30.1 | 28 | 200 | 0.0 | [ 0/ 0] | 0 | 0.000 | 0.000 | 0.000 | O | N |
| 4 | 0 | [ 3/ 10] | 40.40.40.1 | 0 | 100 | 8.0 | [1000/1000] | 0 | 0.000 | 0.000 | 100.000k | S | Y |

FIG. 14

METHOD AND APPARATUS FOR MEASURING AND MANAGING END-TO-END SERVICE LEVEL AGREEMENT IN NETWORK HAVING ENTITIES OF DIFFERENT MOBILE COMMUNICATION NETWORKS

CROSS-REFERENCE TO RELATED APPLICATION(S)

This application claims the benefit under 35 U.S.C. §119(a) of a Korean patent application filed on Oct. 26, 2012 in the Korean Intellectual Property Office and assigned Serial No. 10-2012-0119850, the entire disclosure of which is incorporated hereby incorporated by reference.

TECHNICAL FIELD

The present disclosure relates to a method and apparatus for measuring and managing an end-to-end Service Level Agreement (SLA) in a network having entities of different mobile communication networks.

BACKGROUND

Modern mobile communication network services are evolving to those supported by various combinations of mobile communication network equipment, such as $2^{nd}$ Generation (2G), $3^{rd}$ Generation (3G), and $4^{th}$ Generation (4G) mobile communication network equipment and backhaul and backbone network entities, such as wired communication equipment, including switches, routers, and other mobile communication network equipment. Furthermore, as next generation wireless network environments evolve to further include Internet Protocol (IP) network features, such complexity continues to increase.

Accordingly, network operators use different kinds of Operation And Maintenance (OAM) schemes for managing network failure and quality. However, a need for a Service Level Agreement (SLA) method for collectively managing a network status and quality, from among complicated network nodes, while guaranteeing interoperability among networks, instead of a solution customized only for a particular operator, is growing in order to measure each end-to-end service quality.

In particular, an issue of the quality of next generation wireless networks including Long Term Evolution (LTE) has thus far been consistently raised, and demand for collectively measuring an end-to-end SLA in a network formed of a combination of pieces of equipment of various different networks has increased.

The network quality may be measured with different parameters. The parameters may be classified into a network perspective and a user perspective. From the network perspective, the network quality may be measured by measuring parameters, such as throughput, packet loss, delay, jitter, and other similar and/or suitable parameters; and from the user perspective, the network quality may be measured by measuring a service time, a response time, or other similar and/or suitable parameters.

As mentioned above, with the evolution of mobile communication network services in generations, equipment and elements of various different networks are involved in mobile communication services. Thus, a need exists for a method for measuring network quality, which supports compatibility of various network equipment and elements.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure relates to a method and apparatus for measuring and managing an end-to-end Service Level Agreement (SLA) in a network having entities of different mobile communication networks.

The present disclosure relates to a method and apparatus for measuring and managing SLAs of multiple flows in a network having entities of different mobile communication networks.

In accordance with an aspect of the present disclosure, a method for measuring an end-to-end SLA in a network having entities of different mobile communication networks is provided. The method includes sending a server a test condition for SLA measurement, sending the server a test packet, obtaining from a test result received from the server parameter values for metrics included in the test condition, generating analysis data based on the test condition, and sending the analysis data to a manager unit for the entities based on the test condition.

In accordance with another aspect of the present disclosure, a method for measuring an end-to-end SLA in a network having entities of different mobile communication networks is provided. The method includes receiving a test packet for SLA measurement from a client, measuring parameter values for metrics, the metrics being included in a test condition received from the client in advance, and sending, to the client, a test result that includes the parameter values.

In accordance with another aspect of the present disclosure, an apparatus for measuring an end-to-end SLA in a network having entities of different mobile communication networks is provided. The apparatus includes a transmitter configured to send a test packet to a server, a session controller configured to control the transmitter to send a test condition for SLA measurement to the server, a data analyzer configured to obtain, from a test result received from the server, parameter values for metrics included in the test condition, and configured to generate analysis data based on the test condition, and a data output unit configured to send the analysis data to a manager unit for the entities based on the test condition.

In accordance with another aspect of the present disclosure, an apparatus for measuring an end-to-end SLA in a network having entities of different mobile communication networks is provided. The apparatus includes a receiver configured to receive a test packet for SLA measurement from a client, a measuring unit configured to measure parameter values for metrics, the metrics being included in a test condition received from the client in advance, and a transmitter configured to send the client a test result that includes the parameter values.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will become

FIG. 4 shows a table illustrating test conditions for SLA measurement, according to an embodiment of the present disclosure;

FIGS. 5A and 5B show tables illustrating SLA metrics, according to an embodiment of the present disclosure;

FIG. 6 illustrates how to calculate connectivity and availability, according to an embodiment of the present disclosure;

FIG. 14 illustrates results of performing SLA measurement for multiple flows, according to embodiments of the present disclosure;

Throughout the drawings, like reference numerals will be understood to refer to like parts, components, and structures.

DETAILED DESCRIPTION

Figure 1:
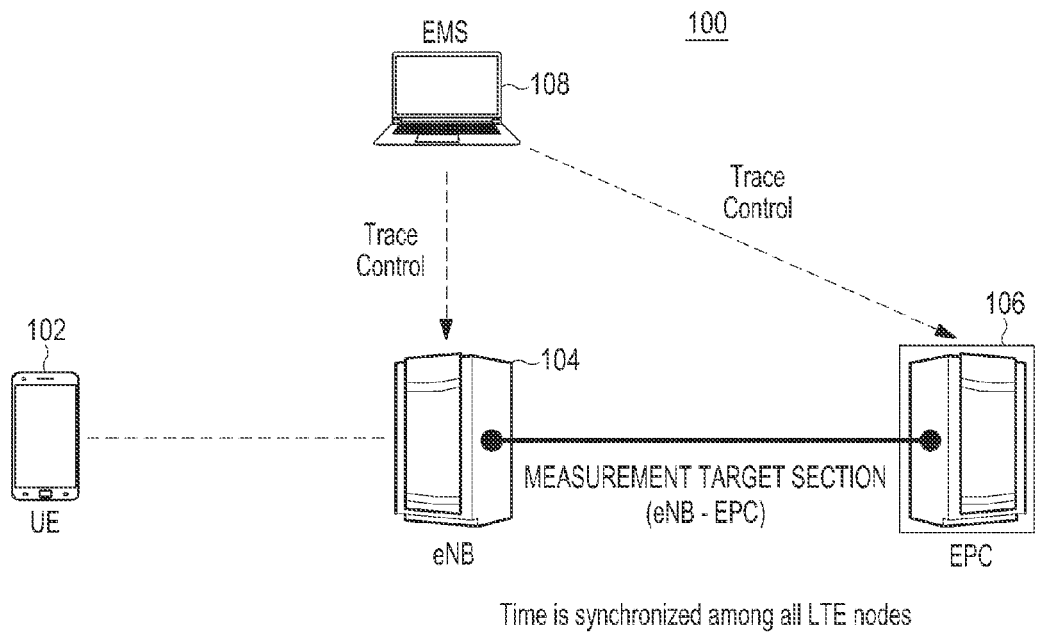
FIG. 1 illustrates a method for quality measurement in a mobile communication network according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. Descriptions shall be understood as to include any and all combinations of one or more of the associated listed items when the items are described by using the conjunctive term "and/or," or the like.

The terminology used herein is for the purpose of describing particular embodiments only and is not intended to be limiting of the disclosure.

It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In general, technologies for measuring network quality are classified into active monitoring, passive monitoring, and hybrid monitoring methods.

The active monitoring method may include generating a probe packet for quality measurement, sending the probe packet to a party whose quality is to be measured, obtaining from the party a probe result packet in which a parameter value is set, and measuring the quality by analyzing the probe result packet. The passive monitoring method may include measuring quality by observing packets actually sent over a network. Finally, the hybrid monitoring method may combine the active monitoring and passive monitoring methods.

FIG. 1 illustrates a method for measuring quality in a mobile communication network according to an embodiment of the present disclosure.

Referring to FIG. 1, a Long Term Evolution (LTE) system 100 is illustrated herein as an example of a mobile communication network. The LTE system 100 includes User Equipment (UE) 102, an evolved Node B (eNB) 104, an Evolved Packet Core 106, and an Element Management System (EMS) 108.

In order to measure network quality from a user perspective, traffic between endpoints, e.g. the eNB 104 and the EPC 106, may be measured. In addition, measuring parameters for quality measurement for each flow between elements of the LTE system 100 enables diagnosis of a cause of a problem, i.e., where the problem has occurred or originated. For this, constituent nodes of the LTE system 100, e.g. the eNB 104 and the EPC 106 have trace points therein. Whenever a probe packet passes each trace point, the trace point reconfigures the probe packet to include parameter measurement results, such as time stamp information for measurement of delay, a sequence number for measurement of packet loss, or other similar and/or suitable parameter measurements, and sends the reconfigured packet to the EMS 108. The EMS 108 then measures traffic quality in the node by comparing the parameter values contained in the packet obtained from the node, e.g. the eNB 104 or the EPC 106, with respective reference values.

As mobile communication networks gradually evolve in generations, a mobile communication network may operate not only with Base Stations (BSs), Base Station Controllers (BSCs), and core equipment, but also with various network elements, such as switches, routers, and any other similar and/or suitable network elements that are used in an Internet Protocol (IP) network.

Figure 2:
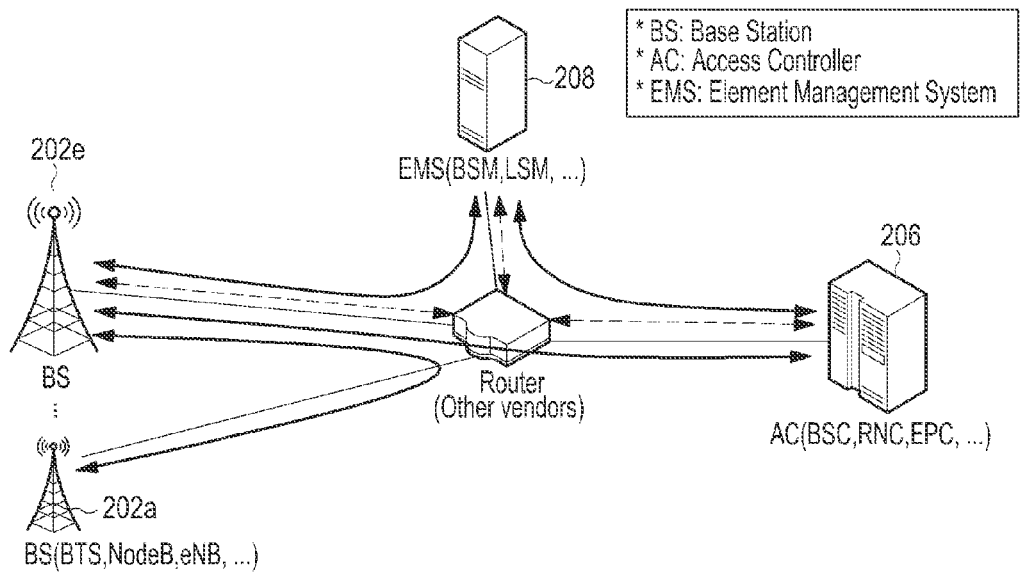
FIG. 2 illustrates a mobile communication system formed of various Internet Protocol (IP) based heterogeneous network entities according to an embodiment of the present disclosure.

FIG. 2 illustrates a mobile communication system formed of various IP based heterogeneous network entities according to an embodiment of the present disclosure.

Referring to FIG. 2, BSs 202a to 202e may correspond to Base Transceiver Systems (BTSs) in a $2^{nd}$ Generation (2G) communication network system, such as a General Packet Radio System (GPRS), to a Node B in a Universal Mobile Telecommunications System (UMTS) Terrestrial Radio Access Network (UTRAN) system; and to an eNB in the LTE system. An Element Management System (EMS) 208 corresponds to Base Station Management (BSM) in the 2 G communication network. An Access Controller (AC) 206 may be configured to correspond to a BSC in the 2 G communication network, to a Radio Network Controller (RNC) in the wideband wireless communication, and to an Evolved Packet Core (EPC) in the LTE system. A router 204 serves to interconnect the BSs 202a though 202e, the EMS 208, and the AC 208.

There are metrics for network quality, which are designated for each mobile communication standard. However, the aforementioned network measurement methods have a problem that they may not support compatibility for different network elements, as shown in FIG. 2. Specifically, the passive monitoring method, which is used among existing technologies for measuring network quality, is based on statistical analysis and thus has limits in obtaining various parameters for Service Level Agreement (SLA) measurement. The active monitoring is based on transmission of measurement packets but uses a different method for each communication operator, thus having difficulty managing an integrated network.

Therefore, a need exists for a framework for a network that includes Backhaul evolving to an all IP network to collectively measure SLA among entities of different communication networks.

Embodiments of the present disclosure provide a method and apparatus for collectively measuring and managing SLA for an end-to-end flow in a network that includes entities of different mobile communication networks, which may also be referred to as 'heterogeneous network entities'. In an embodiment of the present disclosure, a Two-Way Active Measurement Protocol (TWAMP), which is defined as a standard by the Internet Engineering Task Force (IETF), is applied as a base protocol for SLA measurement of a corresponding flow.

According to an embodiment of the present disclosure, a method for measuring SLA may include setting a test condition for SLA measurement, configuring and transmitting and/or receiving a TWAMP control signal and TWAMP test packet based on the test condition, deriving and analyzing an SLA parameter in real time based on a received TWAMP test result, and providing and analyzing a real time alarm if a predetermined standard is violated, based on the set SLA parameter.

Furthermore, in an embodiment of the present disclosure, a method for measuring and managing SLA for multiple flows is disclosed. The method for measuring SLA provides generality by setting different test conditions with a highly scalable TWAMP and enabling multiple operators to support a TWAMP measurement method at switches and routers.

Figure 3:
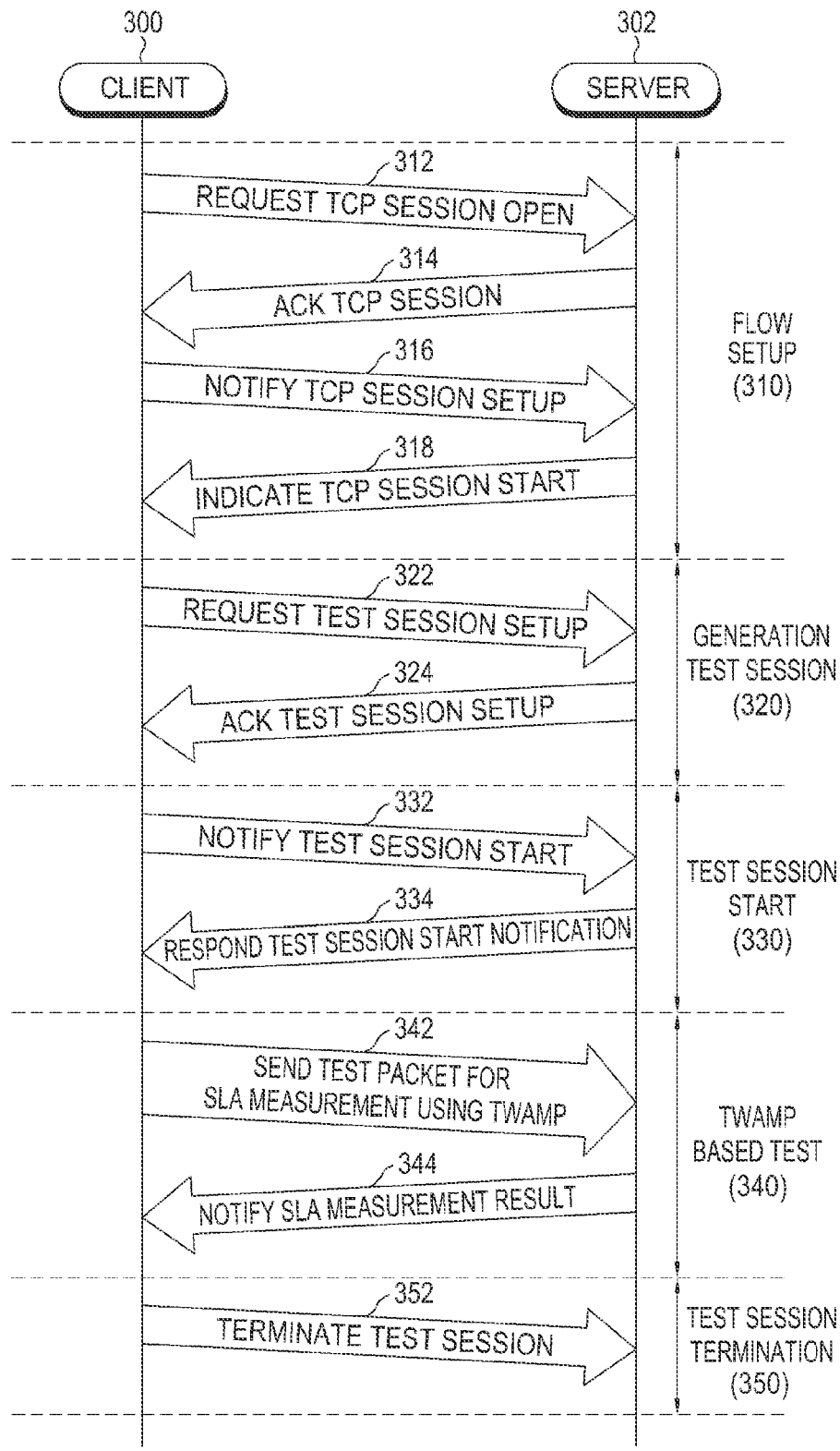
FIG. 3 is signaling chart illustrating operations of establishing and managing sessions for Service Level Agreement (SLA) measurement using a Two-Way Active Measurement Protocol (TWAMP), according to an embodiment of the present disclosure.

FIG. 3 is signaling chart illustrating operations of establishing and managing a session for SLA measurement using a TWAMP, according to an embodiment of the present disclosure.

Referring to FIG. 3, for convenience of explanation, assume that the operations may correspond to operations between a client 300 and a server 302, both of which are end points and are heterogeneous network entities in a network formed of various heterogeneous network entities. However, the present disclosure is not limited thereto, and the operations shown in FIG. 3 may be applied between any two heterogeneous network entities. The client 300 initiates SLA measurement for the other end point and the server 302 is the other end point subject to the SLA measurement.

Operations of establishing and managing sessions for SLA measurement are classified into procedures of flow setup 310, test session generation 320, test session start 330, TWAMP based test 340 and test session termination 350.

In the flow setup 310, in operation 312, the client 300 sends the server 302 a request to open a Transmission Control Protocol (TCP) session for measurement control, in order to exchange SLA measurement conditions, and start and stop measurements. In operation 314, the server 302 sends an acknowledgment (ACK) of the TCP session open request to the client 300. Then, in operation 316, the client 300 establishes a TCP session with the server 302 and notifies the server 302 that the TCP session has been setup. In operation 318, the server 302 indicates, to the client 300, to start using the TCP session.

In the test session generation 320, in operation 322, the client 300 sends the server 302 a request for test session setup, in order to request the server 302 to generate a User Datagram Protocol (UDP) session for transmission and/or reception of a test packet for SLA measurement. Then, in operation 324, the server 302 sends the client 300 an ACK of the test session setup request in response to the request to the test session setup request.

In the test session start 330, the client 300 establishes the UDP session with the server 302, and in operation 332, notifies the server 302 that the test session for SLA measurement has been started. In operation 334, the server 302 sends the client 300 a response to the notification that the test session has begun.

After this, the TWAMP based test 340 is performed. Specifically, in operation 342, the client 300 sends the server 302 a test packet for SLA measurement using TWAMP in the UDP session. The server 302 then performs SLA measurement on the measurement target with the test packet, and in operation 344, notifies the client 300 of the SLA measurement result. In the test session termination 350, in operation 352, the client 300 sends the server 302 a request to terminate the test session. The test session to be terminated is at least one of the TCP session and the UDP session established between the client 300 and the server 302.

As described in FIG. 3, for convenience of explanation, operations of establishing and managing sessions for SLA measurement are sequentially performed in the order of procedures of flow setup 310, test session generation 320, test session start 330, TWAMP based test 340 and test session termination 350. However, in other embodiments, the TWAMP based test 340 and the test session termination 350 may be performed regardless of their order after the test session start 300.

In an embodiment of the present disclosure, test conditions for SLA measurement are set based on the TWAMP. Specifically, the test conditions may be extended to all test conditions needed for the SLA measurement, in addition to primary test conditions that may be set based on the TWAMP.

FIG. 4 shows a table illustrating test conditions for SLA measurement, according to an embodiment of the present disclosure.

Referring to FIG. 4, test conditions may be classified into three groups of conditions, for example: conditions for scheduling a test packet; conditions for setting up a flow for the test packet; and conditions for storing and analyzing a test result.

The conditions for scheduling a test packet may be used to set a time to send the test packet. For example, the conditions for scheduling a test packet may include a parameter to set the test packet to be sent periodically and/or a parameter to set the test packet to be sent based on Poisson statistics. The conditions also include parameters to set a size of the test packet, a count, a frequency band and a time of test packets. The frequency band parameter may be set in a unit like packets per second, bits per second, or any suitable parameter indicating a frequency. The time parameter may include a test duration during which the test packet is tested, a test end time to stop the test; and a delayed start time, which is an extent, or amount of time, to which the predetermined test start time is delayed.

The conditions for setting up a flow for the test packet may include a flow configuration parameter for delivering the test packet, and parameters for setting Differentiated Services Code Point (DSCP) values to indicate control and test signals in the flow by marking the DSCP values.

The conditions for storing and analyzing the test results may include a data file parameter for setting a unit of storing a test result obtained via the test packet, a security parameter for setting authentication and encryption in order to secure the test result, a periodic analysis parameter for determining whether to periodically set a time to obtain the test result, and a log file acquisition and configuration parameter for determining whether data generated by analyzing the test result is to be output on via a LOG file, an EXCEL file, or any similar and/or suitable type of file.

In an embodiment of the present disclosure, the condition for setting up a flow for the test packet, and parameters for setting a time and a count are applied by converting specific test conditions into parameters that are recognizable to TWAMP.

Figures 5B, 6:
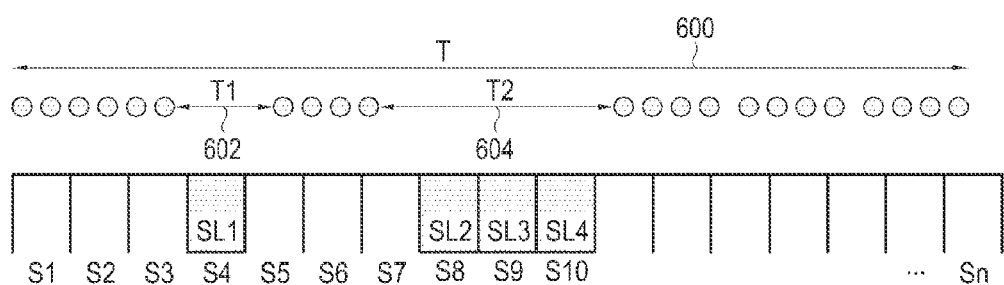

FIGS. 5A and 5B show a table illustrating SLA metrics, according to an embodiment of the present disclosure.

Referring to FIGS. 5A and 5B, the SLA metrics may be classified into first, second, and third metrics. Specifically, the first metrics may include metrics that may be obtained based on the sequence number and the time stamp collected first in SLA measurement via a TWAMP based test packet. As illustrated in FIGS. 5A and 5B, the first metrics may correspond to a category 'count', and SLA metrics of the category 'count' include counts or sums of transmission and/or reception packets.

The second metrics may be obtained by manipulating the first metrics, and may include throughputs, delays, jitters, packet losses, reordering, and any other similar and/or suitable metric, which may be used for network management. As illustrated in FIGS. 5A and 5B, the second metrics may correspond to categories including 'bandwidth', 'timestamp', and 'error', and SLA metrics of the categories may correspond to throughputs, delays and jitters due to one way or two way communication, packet losses and packet loss ratios, sums thereof, reordering, duplicate packet, TTL, or any other similar and/or suitable metric and/or information.

The third metrics may be obtained by applying the second metrics and by referring to measures of quality of service from the user perspective. For example, the third metrics may include a Mean Opinion Score (MOS), an R-Factor, availability, connectivity, or any other similar and/or suitable metric. As illustrated in FIGS. 5A and 5B, a category 'SLA' may include metrics such as, but not limited to, a MOS for distinguishing voice quality, an R-Factor, availability, and connectivity.

SLA metrics of each category are basic indexes used for general network management, and thus the description of them will be omitted herein. Referring to FIG. 5B, a category 'alarm' may be related to an SLA measurement result, as will be described below in detail.

FIG. 6 illustrates how to calculate connectivity and availability, according to an embodiment of the present disclosure.

Referring to FIG. 6, connectivity may be defined by a time of data exchange, which excludes time when packet losses occur, or in other words, a ratio of a time during which a service flow is continued, in terms of a packet, to a total time. As illustrated in FIG. 6, for example, assume that packet losses occur in T1 and T2 of a total measurement time T 600. In this case, connectivity is calculated as represented in Equation 1.

$$\text{CONNECTIVITY} = T - \text{SUM}(Tn)/T \qquad \text{Equation 1}$$

wherein, Tn indicates a time when a packet loss occurs, and n is a sequential number indicating that the packet loss occurs for the n'th time.

That is, connectivity is calculated to be $(T-(T1+T2))/T$ according to Equation 1.

Availability may refer to a service availability in terms of periodic time slots. As illustrated to in FIG. 6, for example, a total measurement time corresponds to n, e.g., n=17, time slots, or any other suitable amount, n being a time slot indicator. Assume herein that packet loss occurs in time slots S4, S8, S9 and S10. In this case, availability is calculated as represented in Equation (2).

$$\text{AVAILABILITY} = (\text{SUM}(Sn) - \text{Sum}(SLn))/T \qquad \text{Equation (2)}$$

That is, according to the embodiment of FIG. 6, availability is calculated to be (17−4/17)=76.47% according to Equation 2.

In the meantime, SLA measurement may need multiple measurement schemes according to an embodiment of the present disclosure. The measurement schemes may include an on-demand measurement scheme, such as a default measurement scheme to diagnose a section where there is an origin of a problem, and a measurement scheme to diagnose the network periodically in the long term, or any other similar and/or suitable measurement scheme. The most needed procedure for this measurement may be to manage an SLA critical value. In an embodiment of the present disclosure, SLA critical values for flows to be measured may be set, and alarms in various forms may be generated if metrics of each test condition, i.e., results of performing SLA measurement for each flow, violate the SLA critical values.

Specifically, in the embodiment of the present disclosure, an SLA critical value may be set for each test condition for SLA measurement, e.g., for each of loss, loss ratio, throughput, delay, jitter, MOS, availability and connectivity, or for any other similar and/or test condition for SLA measurement. Furthermore, if a test condition obtained by means of a test packet for a corresponding flow exceeds the SLA critical value set for the test condition, then a function of generating an alarm may be provided. As illustrated in FIG. 6, for the category 'alarm', for example, SLA critical values for loss, loss ratio, and throughput may be set as SLA metrics.

With the function of providing an alarm in an embodiment of the present disclosure, a network may be managed periodically in the long term. In addition, providing information regarding time and cause of a problem in real time or based on statistics may enable immediate analysis and reaction to the problem that occurred in the network.

Figure 7:
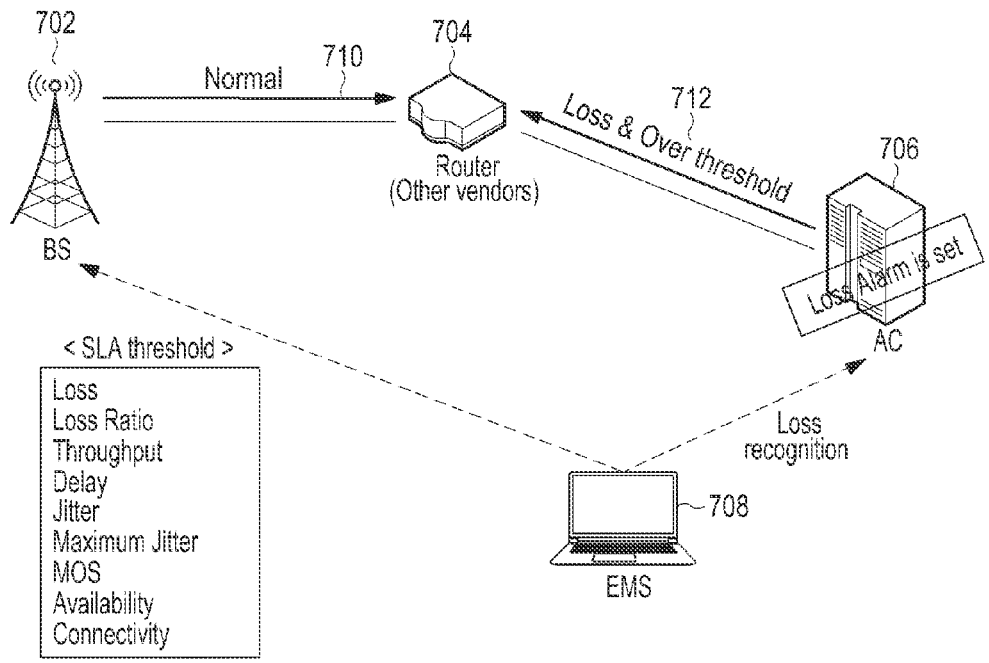
FIG. 7 illustrates an instance where an SLA alarm occurs according to an SLA measurement and SLA critical values, according to an embodiment of the present disclosure.

FIG. 7 illustrates an instance where an SLA alarm is generated using SLA measurement and SLA critical values, according to an embodiment of the present disclosure.

Referring to FIG. 7, a network including a BS 702, a router 704, and an AC 706 is illustrated. As illustrated in FIG. 7, assume that SLA measurement is performed on end-to-end flows, such as flow1 710 between the BS 702 and the router 704 and flow2 712 between the router 704 and the AC 706.

As illustrated in FIG. 7, it is also assumed that the AC 706 has sent test conditions, as shown in FIG. 4, for SLA measurement of flow1 710 and flow2 712 in the TCP session. After that, the AC 706 sends test packets to flow1 710 and flow2 712 in a UDP session. For SLA measurement of flow1 710, a test packet sent by the AC 706 is delivered to the BS 702 through the router 704. The BS 702 then generates a test result based on test conditions set in advance for the test packet. After that, the BS 702 performs SLA measurement for each of the preset test conditions, and delivers at least one test result to the AC 706 through the router 704, the at least one test result being obtained by setting parameter values contained in the test condition as SLA measurement results. The AC 706 then obtains, from the at least one test result, parameter values for each test condition set in advance, and compares the parameter values with preset SLA saturation values. For example, as shown in FIG. 7, it is determined, in the comparison, whether parameter values for loss, loss ratio, throughput, delay, jitter, maximum jitter, MOS, availability, connectivity, and any other similar and/or suitable parameter values, exceed corresponding SLA critical values. In the embodiment of FIG. 7, assume that the test result of the flow1 710 is normal since all the parameter values of the flow1 710 is less than the corresponding SLA critical values.

Upon reception of the test packet for SLA measurement of the flow2 712, the router 704 performs SLA measurement for each of the preset test conditions, and delivers at least one test result to the AC 706, the at least one test result being obtained by setting parameter values contained in the test condition as SLA measurement results. The AC 706 then obtains, from the test result, parameter values for each test condition set in advance, and compares the parameter values with preset SLA saturation values. For example, as shown in FIG. 7, it is determined, in the comparison, whether parameter values for loss, loss ratio, throughput, delay, jitter, maximum jitter, MOS, availability, connectivity, and any other similar and/or suitable parameter values, exceed corresponding SLA critical values. Assume that some of the parameter values of the flow2 712 exceed corresponding SLA saturation values. For example, a parameter value of a loss metric is compared with an SLA critical value for the loss metric, and generates an alarm indicating that there is a problem corresponding to the loss of the flow2 712 because the comparison result meets an alarm generation condition.

If results of SLA measurement of the flow1 710 and flow2 712 are confirmed, then the test results of the flows are sent to the EMS 708. For example, 'normal' and 'loss' alarms, generated for the test results of the flow1 710 and flow2 720, respectively, are sent to the EMS 708.

A Network Management System (NMS) may gather alarm information gathered by the EMS 708 for each flow, and may use the alarm information in order to derive statistics to find a problem of the network as well as to provide a traffic engineering function.

In an embodiment of the present disclosure, SLA critical values are set for metrics that constitute a test condition. A value of at least one test result of performing SLA measurement of a corresponding metric is compared with an SLA critical value predetermined for the metric, and an alarm is set depending on the comparison result. The alarm setting condition may be determined such that the alarm setting condition is met when the test result of a corresponding metric exceeds the corresponding SLA critical value for the metric.

In another example, the alarm setting condition may be determined by subdividing an SLA critical value in order to determine service grades, or any other similar and/or suitable operation on SLA critical values.

Figure 8:
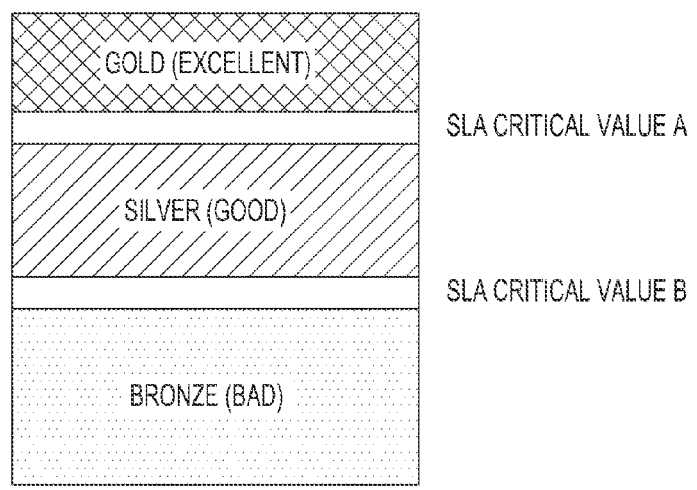
FIG. 8 illustrates subdivision of SLA critical values for classification of service grades, according to an embodiment of the present disclosure.

FIG. 8 illustrates subdivision of SLA critical values for classification of service grades, according to an embodiment of the present disclosure.

Referring to FIG. 8, for example, for each metric of a test condition, a total of two SLA critical values, i.e. critical values A and B, may be set. However, the present disclosure is not limited thereto, and there may be any number of critical values for each metric. Assume that the two critical values A and B are used to divide service grades into three classes: gold, silver, and bronze. However, the present disclosure is not limited thereto, and there may be any number and/or type of service grades for each metric.

Specifically, if a test result of a metric exceeds the critical value A, then the metric indicates that the service grade is in an excellent, i.e. gold, state. If a test result of the metric is equal to or less than the critical value A and equal to or greater than the critical value B, then the metric indicates that the service grade is in a good, i.e. silver, state. Finally, if a test result of the metric is less than the critical value B, then it indicates that the service grade is in a bad, i.e. bronze, state. With the indication of the service grade, a function of dividing and analyzing quality of metrics of the test condition is provided.

Consequently, in the embodiment of the present disclosure, generation of an alarm for a test result of a particular metric enables notification that a disorder, error, problem, or any other occurrence that may generate an alarm, happened to the metric in the flow subject to SLA measurement.

Figure 9:
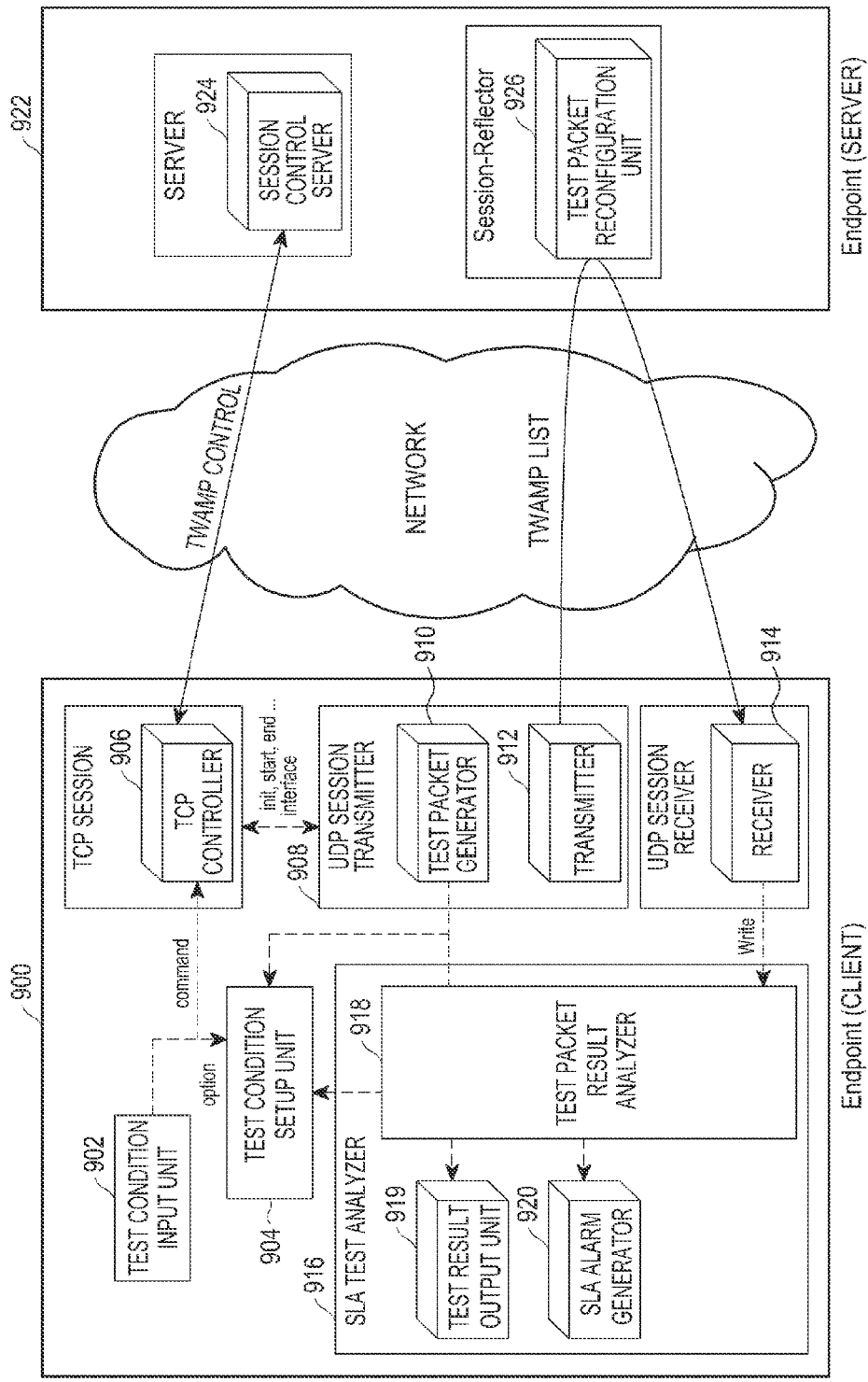
FIG. 9 is a block diagram of a system for SLA measurement, according to an embodiment of the present disclosure.

FIG. 9 is a block diagram of a system for SLA measurement, according to an embodiment of the present disclosure.

Referring to FIG. 9, the system for SLA measurement may include an end point 900, which may be referred to as a client 900, requesting SLA measurement and an end point 922, which may be referred to as a server 922, that performs SLA measurement in response to the request for SLA measurement and sends the result to the client 900. The client 900 may correspond to an AC that actually sends the request for SLA measurement, and the server 922 may correspond to a router, a BS, or any other similar and/or suitable network entity, which is subject to SLA measurement. For convenience of explanation, the client 900 and server 922 are illustrated to be each divided into sub-blocks depending on functions. However, it should be appreciated that the client 900 and the server 922 may be configured in different ways in other embodiments.

The client 900 may include, for example, a test condition input unit 902, a test condition setup unit 904, a TCP controller 906 corresponding to a TCP session, a UDP session transmitter 908, a UDP session receiver 914, and an SLA test analyzer 916.

The server 922 may include, for example, a session control server 924 that may correspond to server, and a test packet reconfiguration unit 926 corresponding to a session-reflector.

Specifically, the test condition input unit 902 allows the user to input a command that includes parameters for setting test conditions, as shown in FIG. 4. The command may be inputted through a user interface, such as a Command Line Interface (CLI) or a Graphic User Interface (GUI), or by any other similar and/or suitable user interface and/or user input element. For example, the command may be configured in the same format as shown in Table 1.

TABLE 1

| twping [-option][arg] dst_ip | |
|---|---|
| [-option] | [arg] |
| -c count | number of test packets |
| -i scheduling | mean average time between packets (seconds) |
| -B bandwidth | bandwidth of test packets |
| -p pps | pps of test packets |
| -d duration | duration of test time |
| -D DSCP | RFC 2474 style DSCP value for TOS byte(UDP: Test-Session) |
| -T DSCP | RFC 2474 style DSCP value for TOS byte(TCP: Control-Session) |
| -l | Save the periodic statistics |
| -f | Save the summary statistics |
| -F file | Save the per-packet data to file |
| -I interval | set periodic analysis interval |
| -L timeout | maximum time to wait for a packet before declaring it lost (seconds) |
| -P portrange | port range for recievers to use |
| -s packetSize | size of the packet (bytes) |
| -z delayStart | time to wait before executing test (seconds) |
| -S srcaddr | use this as a local address for control connection and tests |
| -a alpha | report an additional percentile level for the delays |
| -b bucketwidth | bin size for histogram calculations |
| -n units | 'n', 'u', 'm', or 's' |
| -C | print out periodic statistics by CSV format |
| -R | print RAW data: "SEQNO STIME SS SERR RTIME TTL/SEQNO STIME RS RERR RTIME TTL" |
| -v | print out individual delays |

Options and indicators for the options in Table 1 have substantially the same meaning as those of test conditions and condition classification parameters as shown in FIG. 4, and thus the description of them will be omitted herein.

The test condition setup unit 904 parses the parameters from the command, and classifies the parameters into test options, such as, e.g. a size and a number of the test packets and flow related parameters for SLA measurement. The test condition setup unit 904 stores the test options as variables and sends the flow related parameters to the session controller 906.

The session controller 906 establishes at least one of a TCP session and a UDP session with the session controller 924 of the server 922 using the flow related parameters. The TCP session may be used for signal transmission and/or reception, e.g. for exchange of the test condition for SLA measurement and measurement control, such as to start the test and stop the test. The UDP session may be used for transmission and/or reception of test packets for SLA measurement. Such sessions are established by the flow setup procedure 310 to test session start procedure 330, as shown in FIG. 3, and thus further descriptions thereof will be omitted herein. In the TCP session, a control message exchanged between the client 900 and server 922 includes a TWAMP based TWAMP control message. The TWAMP control message may be represented as shown in Table 2.

TABLE 2

| |
|---|
| Server Greeting |
| Set-up-Response |
| Server-Start |
| Request-TW-Session |
| Accept-TW-Session |
| Start-Sessions |
| Start-Ack |
| Stop-Sessions |

Messages listed in Table 2 may be described in connection with the operating procedures of FIG. 3. A 'Server Greeting' message may be used by the server to respond to a TCP open request sent from the client in operation 314 of FIG. 3. A 'Set-up Response' message may be used by the client to notify that a TCP session has been established with the server in operation 316 of FIG. 3. A 'Server start' message may be used by the server to indicate, to the client, to start using the TCP session in operation 318 of FIG. 3. A 'Request-TW-Session' message may be used by the client to send a request to establish a UDP session for exchanging a test packet for SLA measurement in operation 322 of FIG. 3. An 'Accept-TW-Session' message may be used by the server to respond to the request to establish the UDP session in operation 324 of FIG. 3. A 'Start-sessions' message may be used by the client to notify the server of a test start for SMA measurement, in operation 322 of FIG. 3. A 'Session-Ack' may be used as a response to the 'start-sessions' message. A 'Stop-sessions' message may be used by the client to send the server a request to stop the test session, i.e. the UDP session, in operation 350 of FIG. 3.

After that, once test condition setting is negotiated with the server 922 in the TCP session, then a test packet generator 910 of the UDP session transmitter 908 generates test packets. A transmitter 912 then forwards the test packets to the server 922 according to scheduling information contained in the command. The test packets may be transmitted in the form of a TWAP-Test message, or in the form of any suitable and/or similar message.

When the server 922 receives the test packets, the test packet reconfiguration unit 926 measures values that correspond to parameters, set as shown in FIG. 4, for each test condition obtained in the TCP session, and then, the server 922 sends a test packet that has been reconfigured to include the parameter values, hereinafter, called 'a test result', to the client 900 in the UDP session. The test result is also transmitted in the form of the TWAP-Test message, or in the form of any suitable and/or similar message.

When the receiver 914 of the client 900 receives the test result from the server 922, then a test packet result analyzer 918 of the SLA test analyzer 916 generates raw data by analyzing the parameter values obtained from the test result for the metric and the test condition obtained from the command, and the test result analysis data for the second and third metrics, as described above. A test result output unit 919 then outputs the test result analysis data, based on the metrics and test conditions obtained from the command, periodically or at predetermined intervals. An SLA alarm generator 920 compares the test result value for each metric with an SLA critical value set for at least one of the metric and the SLA critical values that are subdivided, as shown in the embodiment of FIG. 8, and the SLA alarm generator 920 may generate an SLA alarm based on the comparison. Test result data obtained according to a test option obtained in the command may be provided in various formats, e.g. in statistical values in a txt file, a csv file, or any other similar and/or suitable file type.

Figure 10A:
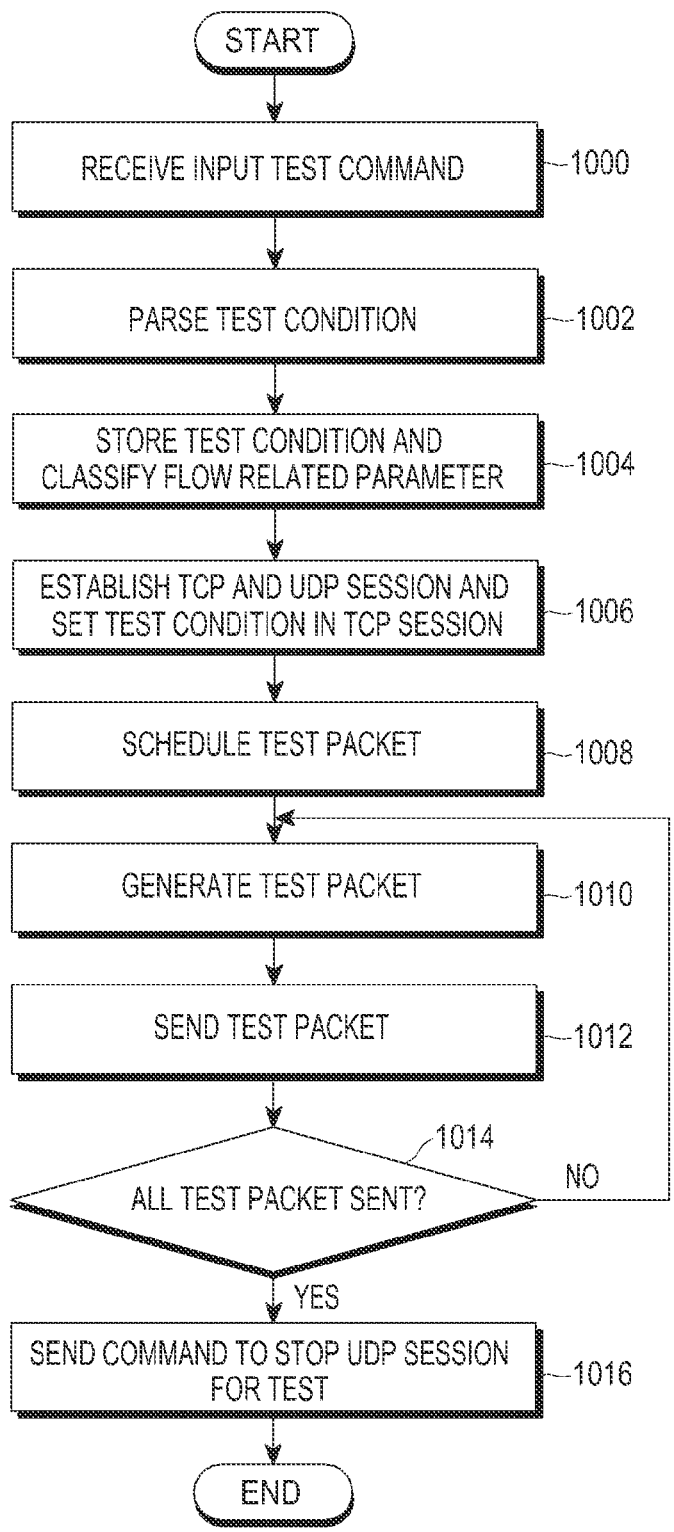
FIG. 10A is flowchart illustrating operations of a client transmitting test packets for SLA measurement of a particular flow, according to an embodiment of the present disclosure.
Figure 10B:
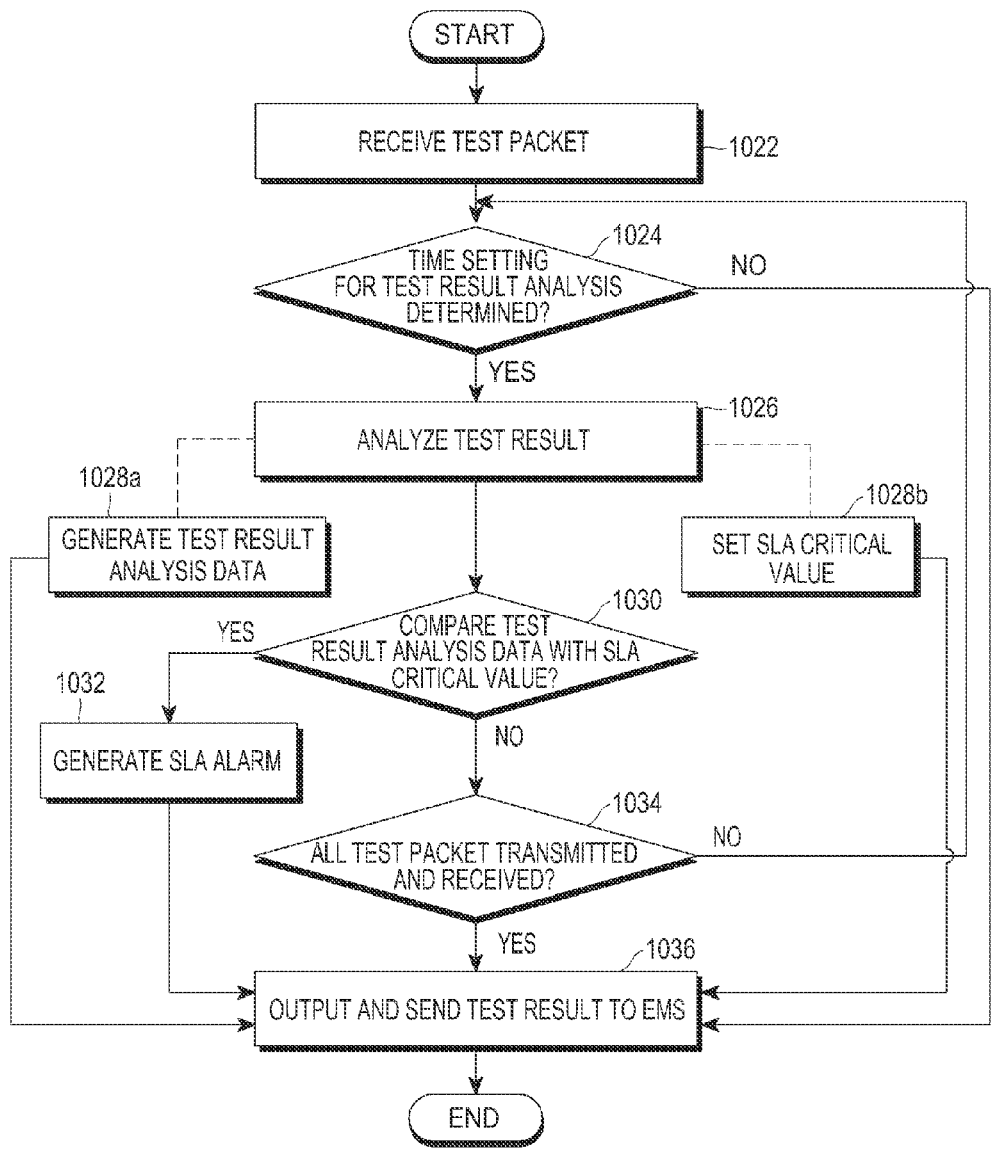
FIG. 10B is flowchart illustrating a client receiving, from another end point, and analyzing test results of a flow subject to SLA measurement, according to an embodiment of the present disclosure.

FIG. 10A is a flowchart illustrating operations of a client transmitting test packets for SLA measurement of a particular flow, according to an embodiment of the present disclosure; and FIG. 10B is flowchart illustrating a client receiving, from another end point, and analyzing test results of a flow subject to SLA measurement, according to an embodiment of the present disclosure.

Referring to FIGS. 10A and 10B, the operations of SLA measurement, from the client perspective, may include: configuring and sending a test packet for SLA measurement of a particular flow; performing a test on the particular flow upon reception of the test packet, generating the test result, and sending the test result to the client; and analyzing the test result and generating the analysis result and an SLA alarm based on the analysis result, which is performed by the AC that receives the test result.

As illustrated in FIG. 10A, in operation 1000, the client receives, from the user, a test command for SLA measurement of a particular flow. The test command includes parameters for setting test conditions, as shown in FIG. 4. The test command may be inputted through a user interface, such as a CLI or a GUI. In operation 1002, the client parses the parameters, or in other words, the test condition, included in the command, and in operation 1004, the client stores the test conditions and classifies, or in other words, distinguishes, flow related parameters for SLA measurement. In operation 1006, the client establishes TCP and UDP sessions with the other end point for SLA measurement of the particular flow using the flow related parameters. The client further negotiates and agrees upon, i.e. settles, test conditions with the server based on the parameters included in the command in order to set the test conditions in the TCP session. A control message exchanged therebetween may be a TWAMP control message, as shown in Table 2.

In operation 1008, the client schedules a test packet based on the test conditions. In operation 1010, the client generates test packets to match the scheduling condition. The test packets also conform to the format of the TWAMP based packet. In operation 1012, the client sends, to the other end point, the test packet under the scheduling condition.

Then, in operation 1014, the client determines whether all the test packets have been sent. If all of the test packets have not been sent, then the client returns to operation 1008 to schedule a test packet to be sent next.

Otherwise, if all the test packets have been sent, then, in operation 1016, the client terminates the UDP session for testing by sending, to the other end point, a command to stop the UDP session in the TCP session.

As illustrated in FIG. 10B, assume that the client and the other end point have established TCP and UDP sessions with each other.

As illustrated in FIG. 10B, in operation 1022, the client receives a test result, included in a test packet, from the other end point. The test result corresponds to the test packet reconfigured by the test packet reconfiguration unit 926 to include measurement values of parameters needed for each test condition set in advance, and the test packet is received in the form of the TWAP-Test message.

In operation 1024, the client determines time settings for analyzing the test result, from scheduling information obtained from the command, in operation 1006. For example, if the test condition includes an indication of periodic analysis, then the client analyzes received test results periodically in operation 1026. With the indication of periodic analysis, the test condition also includes information about detailed intervals of the analysis. In this case, the client proceeds to operation 1026 at every starting point of the interval. If a current point in time does not correspond to the starting point of the interval, then the client waits until the starting point of the interval.

In operation 1026, the client analyzes parameter values obtained from the test result based on a metric and test condition obtained from the command in operation 1000.

In operation 1028a, the client generates raw data by analyzing the parameter values, and generates test analysis result data for the second and third metrics, as mentioned above. If the test condition obtained from the command indicates 'periodic analysis', then the test analysis result data may include metrics as shown in Table 3.

TABLE 3

Tx/Rx count (Sum/Delta)
TX/RX pps/bps (Sum/Delta)
Skip (Sum/Delta)
Drop (Sum/Delta)
Loss (Sum/Delta)
Delay min/avg/max
Jitter min/avg/max
MOS
R-factor
Availability
Connectivity
ALARM A Tx/Rx count indicates a number of transmissions and/or receptions of a corresponding parameter; a Tx/Rx pps/bps indicates the Tx/Rx count in packets per second (pps) or bits per second (bps) units; a Skip indicates the number of not receiving the parameter during the periodic analysis; a Drop indicates the number of cancellations of the parameter during the periodic analysis; and a loss indicates the number of times for missing the parameter during the periodic analysis. Other metrics were described in connection with FIGS. 5A and 5B, so the detailed descriptions of them will be omitted herein.

In operation 1028b, the client sets an SLA critical value, which is a reference value for generating an SLA alarm, in order to notify that a disorder has occurred in the flow, based on the test result analysis data. The SLA critical value is set for each SLA metric as described above, and has a single value in an embodiment of the present disclosure or may be sub-divided for classification of service grades.

In operation 1030, the client compares the test result analysis data with an SLA critical value set in advance. The test result analysis data and the SLA critical value are classified for a particular metric. If the test result analysis data has a value that exceeds the SLA critical value for the particular metric, then, in operation 1032, the client generates an SLA alarm for the particular metric. The SLA alarm is outputted to the EMS in operation 1036.

If it is determined that the test result analysis data has a value that does not exceed the SLA critical value for the particular metric in operation 1030, the client proceeds to operation 1034. While in this embodiment a single SLA critical value was taken as an example, in other embodiments the SLA critical value may be sub-divided for classification of service grades as shown in FIG. 8.

In operation 1034, the client determines whether all the test packets have been transmitted to the other end point and all the test results have been received from the other end point. This determination may be achieved by comparing counts of the test packets and received test results with a corresponding parameter value because the client is already aware of the parameter value indicating the count of test packets from the test condition obtained from the command of operation 1000. If it is determined that not all of the test packets have been transmitted or that not all of the test results have been received, then the client returns to operation 1022 to wait for reception of a next test packet. Otherwise, if all the test packets have been received, the client proceeds to operation 1036.

In operation 1036, the client performs Summary analysis, and generates and outputs Summary analysis result data to the EMS, or in other words, the client outputs and sends test results to the EMS. If the client is not an AC, then the client sends the Summary analysis result data to the EMS through the AC. In this regard, the client outputs the Summary analysis result data at a time that corresponds to an output time obtained from the command. If the output time needs test analysis result data obtained from the periodic analysis to be outputted, then the test analysis result data generated in operation 1028a is outputted. If an SLA alarm is set in operation 1032, then the SLA alarm is outputted as well. The Summary analysis result data may include metrics as shown in Table 4, for example. The metrics were described in FIG. 4 and FIGS. 5A and 5B, so the descriptions thereof will be omitted herein.

TABLE 4

Test Condition: SID, First/Last send time, Mode, IP, PORT, DSCP, Packet Size, Bandwidth, Packet Count, Pacekt Scheduling, Test Duration, Clock Sync, Timeout
TOTAL/TX/RX packets Count
Valid Rx packet Count
Loss, Skip, Network Loss, Internal Loss Count
Loss Ratio
Duplicated
Reordering
TX/RX bps/pps
Delay(two-way) min/avg/median/max
Delay(one-way) min/avg/median/max (If Time sync is synchronized)
Jitter(two-way) min/avg/max
Jitter(one-way) min/avg/max
TTL Count
MOS: min/avg/max
R-factor: min/avg/max
Connectivity
Availability
Alarm Violation Statistics In another embodiment of the present disclosure, a scheme for measuring SLA of multiple flows simultaneously or sequentially as well as measuring SLA of a single flow on demand is provided. This SLA measurement of multiple flows enables a single piece of equipment, i.e. an AC, to manage measurement results of the multiple flows and monitor their disorders in real time.

Figures 11, 12:
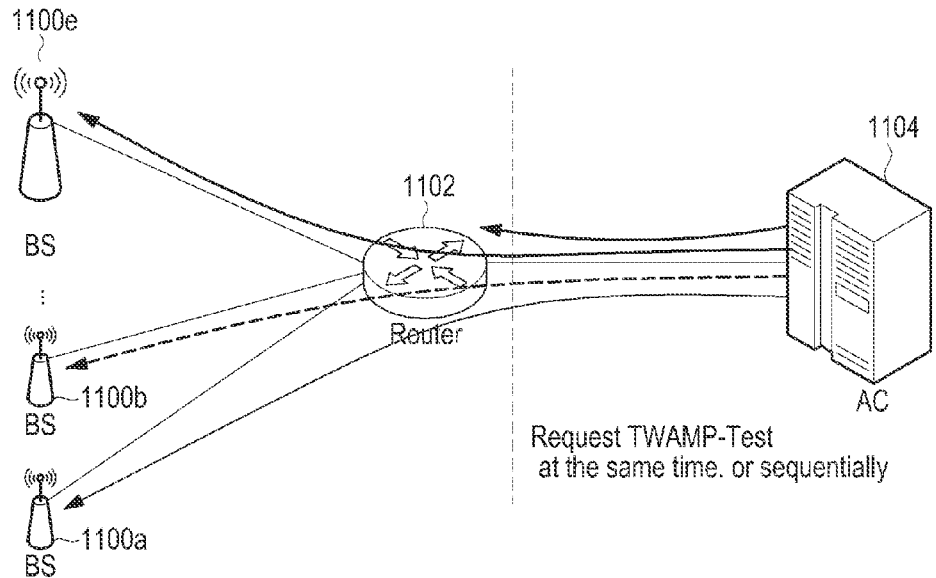
FIG. 11 illustrates a system for SLA measurement of multiple flows, according to another embodiment of the present disclosure.
FIG. 12 illustrates inter-flow control information, according to an embodiment of the present disclosure.

FIG. 11 illustrates a system for SLA measurement of multiple flows, according to another embodiment of the present disclosure.

Referring to FIG. 11, an AC 1104 performs SLA measurement on end-to-end flows with respect to multiple BSs 1100a to 1100e connected thereto via a router 1102. Specifically, the end-to-end flows includes flows between each of the BSs 1100a to 1100e and the router 1102, and a flow between the router 1102 and the AC 1104. The multiple BSs 1100a to 1100e belong to different types of communication networks and may be different types of network entities, such as BTS, Node B, or any other similar and/or suitable BS entity.

In the embodiment of FIG. 11, in addition to setting a test condition for each of the multiple flows, setting multiple flow management for managing SLA measurement of the multiple flows is needed.

Specifically, in order to manage SLA measurement for the multiple flows, inter-flow control information and a test condition per flow are set. The inter-flow control information and the test condition per flow are set by the user and stored on a transmitter side that instructs measurement of the multiple flows. The transmitter side corresponds to a session manager 1501 of FIG. 15, which may be the AC 1104.

FIG. 12 illustrates the inter-flow control information, according to an embodiment of the present disclosure.

Referring to FIG. 12, the inter-flow control information includes 'NUMBER_OF_LOOP', 'LOOP_INTERVAL', 'SEQ_INTERVAL', and 'SEQ_NUMBER' parameters.

The 'NUMBER_OF_LOOP' parameter indicates a total number of performances of SLA measurement on each of the multiple flows. If the total number is inputted as unlimited or a very large number, then measurement results corresponding to the total number may be processed statistically in the long term and provided to the EMS. For example, referring to FIG. 13, the total number is set to be 10.

The 'LOOP_INTERVAL' parameter indicates SLA measurement intervals for the multiple flows. That is, the 'LOOP_ INTERVAL' parameter refers to an interval indicating at what intervals the measurement is repeated for the same flow. For example, the 'LOOP_INTERVAL' parameter is set such that meaningful statistics may be obtained for network operation, such as '5 minutes statistics', '15 minutes statistics', or statistics for any similar and/or suitable amount of time. For example, referring to FIG. 13, the 'LOOP_INTERVAL' parameter is set to be 300 seconds.

The 'SEQ_INTERVAL' parameter indicates at what time intervals the SLA measurement is to be performed for each flow subject to SLA measurement. The 'SEQ_INTERVAL' parameter is set to secure a gap needed for measurement while switching SLA measurement flows or sessions. For example, referring to FIG. 13, the 'SEQ_INTERVAL' is set to be 5 seconds.

The 'SEQ_NUMBER' parameter indicates a target flow subject to SLA measurement. The 'SEQ_NUMBER' parameter is always set to be an increasing value. If the same value of the 'SEQ_NUMBER' parameter is set for different flows, it means that the flows are to undergo SLA measurement at the same time. For example, referring to FIG. 13, a 'SEQ_NUMBER' parameter with number 2, shown as 'SEQ2', is set for two flows.

Table 5 represents examples of pieces of information included in 'Test Condition per Flow', according to an embodiment of the present disclosure.

TABLE 5

Test Condition per Flow

IP Address
Bandwidth
Duration (measurement time per flow, disabled to be measured together with Count at the same time)
Count (test packet count, disabled to be measured together with Duration at the same time)
PKTSIZE (Packet Size)
QoS (DSCP value referring to QoS Class of Test Packet)
Log (Whether to generate Log File)

The Duration may designate a time to perform SLA measurement for each flow, and the duration may not be measured together with the Count at the same time. The Count indicates a count of test packets for SLA measurement for a particular flow, and the Count may not be measured together with Duration.

The PKTSIZE indicates a size of the test packet, and the Quality of Service (QoS) is a Differentiated Services Code Point (DSCP) value representing a QoS class of the test packet. The Log indicates whether to generate a test result of a particular result in the form of a LOG file.

Figure 13:
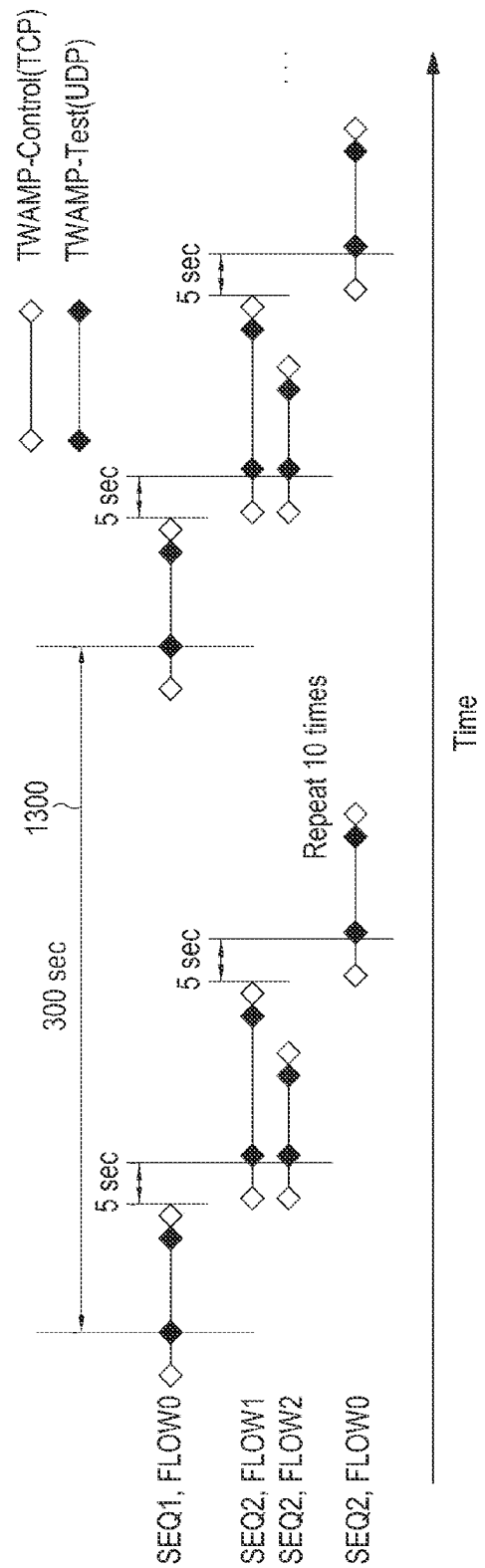
FIG. 13 illustrates operations of controlling multiple flows, according to an embodiment of the present disclosure.

FIG. 13 illustrates operations of controlling multiple flows, according to an embodiment of the present disclosure.

Referring to FIG. 13, assume herein that the inter-flow control information is set based on parameters of FIG. 12. As illustrated in FIG. 13, with the 'NUMBER_OF_LOOP' parameter set to be 10, a loop is performed 10 times in order to repeat SLA measurement per flow for all the flows.

For a first flow corresponding to SEQ1, which indicates 'SEQ_NUMBER 1', SLA measurement is performed at an interval 1300 of 300 seconds according to the 'LOOP_INTERVAL' parameter, and 5 seconds of switching time is taken to switch SLA measurement of one flow to another, according to the 'SEQ_INTERVAL' parameter set to be 5 seconds. For example, referring to FIG. 14, it is seen that SLA measurement of the second flow is performed 5 seconds after first SLA measurement of the first flow is completed.

Since the same 'SEQ_NUMBER', i.e. SEQ2, is set for the second and third flows, SLA measurement of the second and third flows is performed at the same time.

FIG. 14 illustrates results of performing SLA measurement for multiple flows, according to embodiments of the present disclosure.

Referring to FIG. 14, assume herein that SLA measurement for multiple flows is performed based on parameters as shown in FIG. 12. As illustrated in FIG. 14, for explanation, results of performing SLA measurement for multiple flows are classified by the 'inter-flow control information' and the 'test condition per flow'.

First, a 'SEQ INTERVAL' 1401 and a 'LOOP INTERVAL' 1402, which are included in the category of the 'test condition per flow', are set to be 5 seconds and 300 seconds, respectively. A 'LOOP REMAINING' 1403 periodically indicates a remaining measurement time with respect to the 'LOOP_INTERVAL'.

A SEQ 1404, which is a 'SEQ_NUMBER' parameter, indicates information set for each flow and information about a SEQ currently subject to SLA measurement. That is, a SEQ, which is currently subject to SLA measurement, is marked with '*' ahead of the SEQ_NUMBER. For example, referring to FIG. 14, SEQ 1 is marked with '*', indicating that SLA measurement is underway for the first flow SEQ 1. A FLOW 1405 indicates a number and/or identifier of a respective flow.

An ITERATION 1406 indicates the number of performances of SLA measurement that has thus far been performed out of the total SLA measurement number set according to the 'NUM OF LOOP' parameter. For example, referring to FIG. 14, the first flow corresponding to SEQ 1 is indicated as undergoing SLA measurement, and going around the SLA measurement loop a fourth time out of a total of 10 times, i.e. iteration 4 out of 10.

A DSCP 1408, a SIZE 1409, a DURATION 1410, and other values discussed above with respect to FIG. 13, output the same values as those set in FIG. 13.

A TEST 1411 indicates the number of packets that have thus far been transmitted out of a total count of test packets to be sent. For example, referring to FIG. 14, a 375th test packet is being sent, out of a total of 10,000 test packets to be sent, in the first flow.

A LOSS 1412, a DELAY 1413, a JITTER 1414, and a BANDWIDTH 1415 also indicate outputs of SLA metric values being currently measured at the other end point for each test condition set as shown in FIG. 13. The SLA metric values are updated on the screen at measurement intervals. A STAT 1416 indicates a state of a particular flow in SLA measurement. For example, 'S' indicates that SLA measurement was successfully performed, or in other words, indicates TWAMP-Test Success, and 'T' indicates that SLA measurement is underway, or in other words, indicates Running TWAMP Test. A LOG 1417 indicates whether a log file has been generated according to an SLA measurement result of the particular flow, as yes (Y) or no (N).

Figure 15:
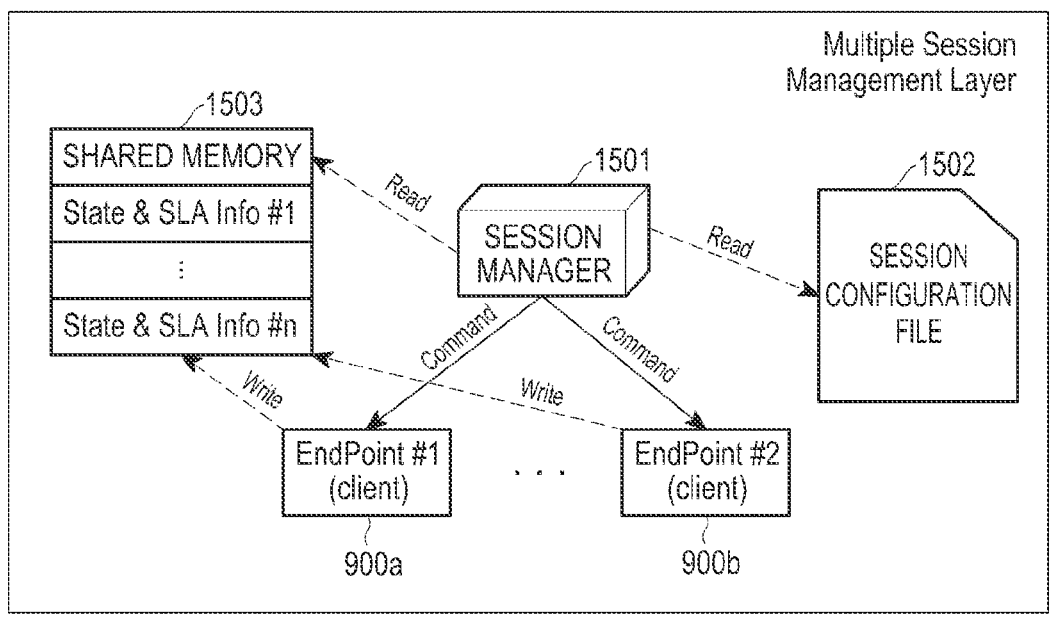
FIG. 15 is a block diagram illustrating an apparatus for managing multiple flows, according to an embodiment of the present disclosure.

FIG. 15 is a block diagram illustrating an apparatus for managing multiple flows, according to an embodiment of the present disclosure.

Referring to FIG. 15, a session manager 1501 creates a command to perform SLA measurement, which may also be referred to as an SLA measurement command, on multiple flows.

The session manager 1501 sends the command to each of end point #1 900a to end point #n 900n through a CLI. The session manager 1501 reads the 'inter-flow control information' and 'test condition per flow' for SLA measurement of each flow from a session configuration file 1502 obtained from a user input, and the session manager 1501 inserts them in the SLA measurement command. The session manager 1501 may correspond to an AC.

SLA measurement is performed on a flow from each of the end point #1 900a to end point #n 900n, based on the inter-flow control information and test condition per flow. Operations of SLA measurement for a flow from each of the end point #1 900a to end point #n 900n are performed in the system shown in FIG. 9 according to flowchart of FIGS. 10A and 10B. Thus, the description thereof will be omitted herein.

End point #1 900a to end point #n 900n store SLA measurement results of their respective flows in a shared memory 1503. The SLA measurement result includes at least one of test analysis result data, summary analysis result data, and an SLA alarm. The end points #1 900a to end point #n 900n may be ACs, or heterogeneous entities, which are routers, BSs, or any other similar and/or suitable network entity.

If the end point #1 900a to end point #n 900n are not ACs, then they store SLA measurement results of their respective flows in the shared memory 1503 via an AC. The shared memory 1503 may be located within an AC or at any place where the shared memory 1503 may be shared by the end points #1 900a to #n 900n. Contrary to operations of FIGS. 10A and 10B, the end points #1 900a to #n 900n, each including the session controller 904, the receiver 914, and the test analyzer 916 of FIG. 9, store SLA metrics and current states in the shared memory 1503 as soon as the SLA metrics and current states are outputted from those elements. The session manager 1501 reads the SLA metrics and current states from the shared memory 1503 at predetermined intervals. The SLA metrics and current sates are represented as shown in Table 6.

TABLE 6

SEQ Number
FLOW Number
ITERATION count
IP_ADDRESS (destination)
DSCP value
Packet Size
Test Duration
Packet count
Cumulative LOSS
Periodic DELAY
Periodic JITTER
Periodic BANDWIDTH
Current State
LOG enable In Table 6, parameters indicating SLA metrics and current states are the same as what are described above, so the description thereof will be omitted herein.

As a value of 'Current State', one of the parameters of Table 6, for example, one of some characters or symbols, such as '.', 'C', 'T', 'S', 'F', and 'O', is outputted.

When the value of the 'Current State' is '.', such indicates that the current state is a state ready for session setup, or in other words, Ready for TWAMP Session. An 'X' indicates that the current state includes an error that occurred during TWAMP test configuration, or in other words, TWAMP-Test Configuration error. A 'C' indicates that a TCP session has been established, or in other words, TWAMP-Control Established. A 'T' indicates that SLA measurement is underway, or in other words, Running TWAMP Test. An 'S' indicates that SLA measurement has been successfully completed, or in other words, TWAMP-Test Success. An 'F' indicates that signal transmission and/or reception in the TCP session or the UDP session has failed, or in other words, TWAMP-Control or TWAMP-Test Failed. An 'O' indicates that corresponding bandwidth is being used too much, or in other words, Bandwidth Overbooking.

Figure 16A:
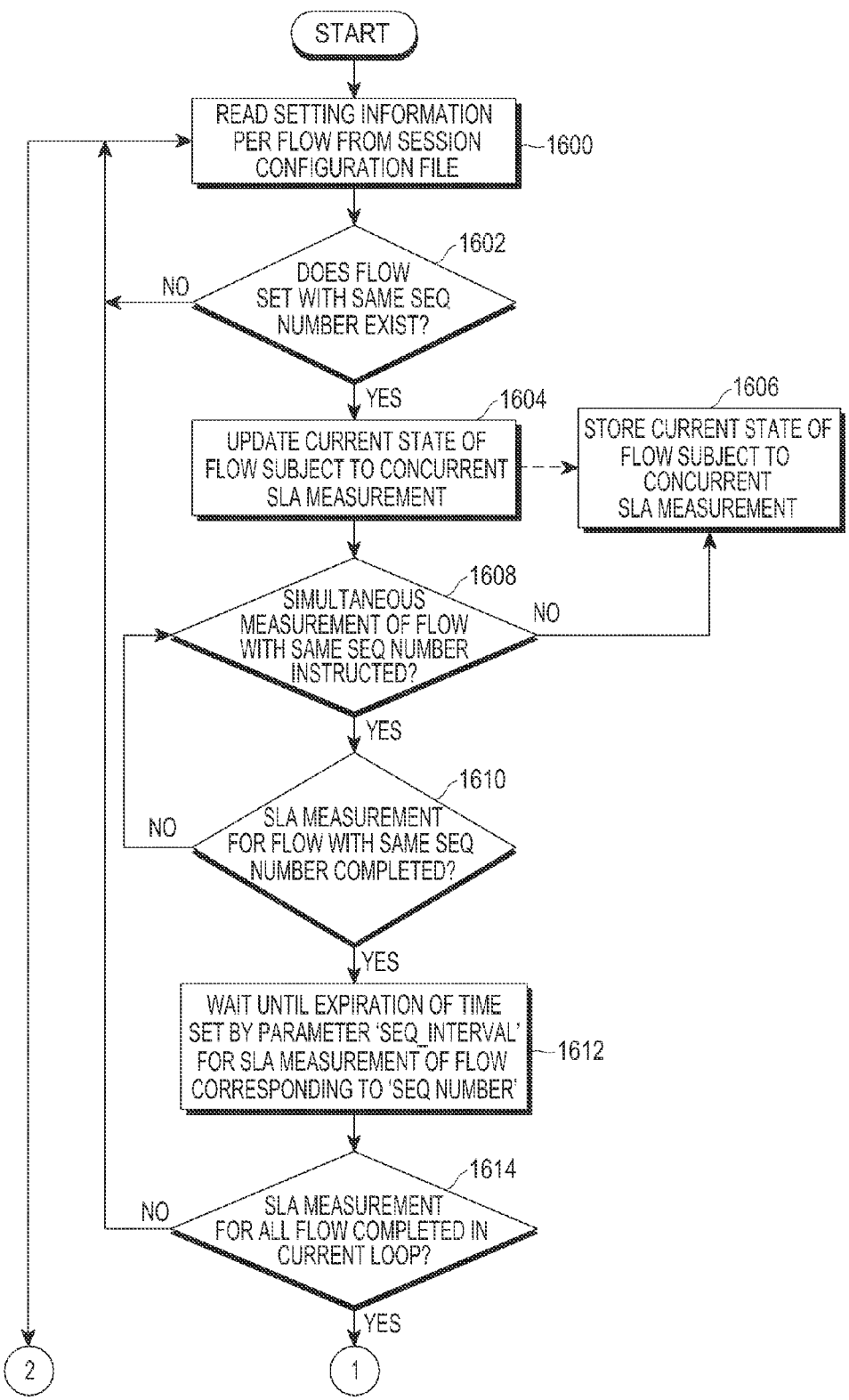
FIGS. 16A and 16B are flowcharts illustrating operations of controlling and managing SLA measurement of multiple flows, according to another embodiment of the present disclosure.
Figure 16B:
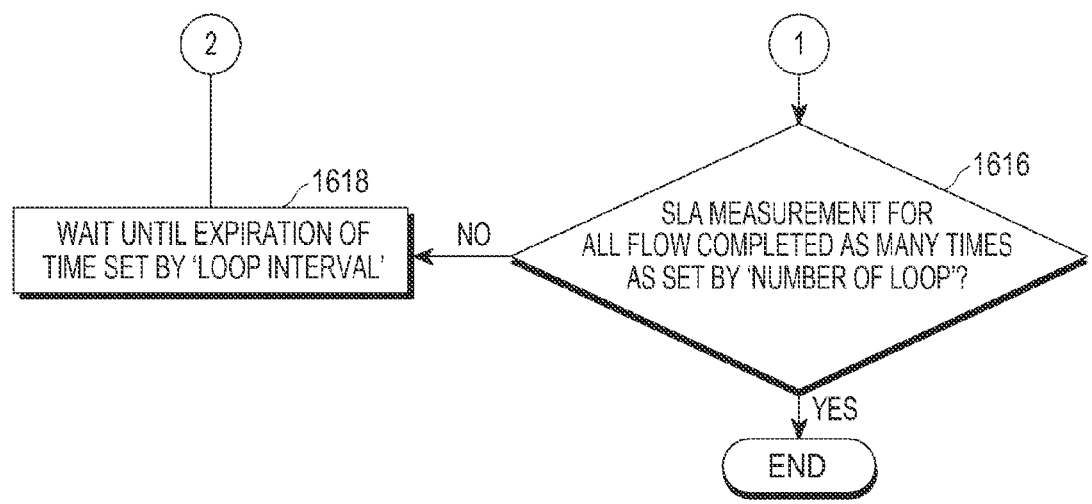

FIGS. 16A and 16B are flowchart illustrating operations of controlling and managing SLA measurement for multiple flows, according to another embodiment of the present disclosure.

Referring to FIGS. 16A and 16B, in operation 1600, a session manager, such as the session manager 1501 reads configuration information for each flow, i.e. the session manager 1501 reads the 'inter-flow control information' and 'test condition per flow' for SLA measurement sequentially from the session configuration file obtained from a user input. Assume that the 'inter-flow control information' and 'test condition per flow' are configured with parameters as shown in FIGS. 12 and 13.

In operation 1602, the session manager determines whether there is any flow existing with and/or having the same value as that of the 'SEQ_NUMBER' parameter obtained from the test condition per flow. If there is no flow having the same value as that of the 'SEQ_NUMBER' parameter, then the session manager 1501 returns to operation 1600.

Otherwise, if there is at least one flow having the same value as that of the 'SEQ_NUMBER' parameter, then, in operation 1604, the session manager 1501 updates the current state of the at least one flow having the same value as the 'SEQ_NUMBER' parameter value, and in operation 1606, the session manager 1501 stores the updated current state of the at least one flow having the same value as the 'SEQ_NUMBER' parameter value in a shared memory, or in other words, stores the current state of the flow subject to concurrent SLA measurement.

In operation 1608, the session manager 1501 determines whether SLA measurement for the at least one flow having the same value as the 'SEQ_NUMBER' parameter value to be performed simultaneously has been instructed. If the SLA measurement has not been instructed, as determined in operation 1608, then the session manager 1501 goes to operation 1606 to store the current state of the at least one flow on which the SLA measurement is performed simultaneously, i.e., the session manager 1501 stores 'T' indicating that SLA measurement is underway, or in other words, Running TWAMP Test, in the shared memory for each flow. Likewise, as SLA measurement is performed on flows having the same 'SEQ_NUMBER' parameter value, SLA measurement results are stored by end points for corresponding flows in the shared memory. Otherwise, if the SLA measurement has not been instructed, as determined in operation 1608, then the session manager 1501 goes to operation 1610 in order to determine whether SLA measurement for each flow having the same 'SEQ_NUMBER' has been completed.

The session manager 1501 proceeds to operation 1608 if it is determined that SLA measurement for flows having the same 'SEQ_NUMBER' parameter value has not yet completed in operation 1610. Otherwise, if it is determined that SLA measurement for flows having the same 'SEQ_NUMBER' parameter value has been completed, in operation 1610, then the session manager proceeds to operation 1612. In operation 1612, the session manager waits until expiration of a time set by the 'SEQ_INTERVAL' parameter value obtained from the test condition per flow, for SLA measurement for at least one flow corresponding to the next 'SEQ_NUMBER' parameter value.

In operation 1614, the session manager determines whether SLA measurement for all the flows has been completed in the current loop. If it is determined that SLA measurement for all the flows has not been completed in the current loop, then the session manager returns to operation 1600. After waiting until expiration of the time set by the 'SEQ-INTERVAL' parameter value obtained from the test condition per flow in the current loop for SLA measurement of at least one flow corresponding to the next 'SEQ_NUMBER' parameter value, the session manager instructs SLA measurement for the at least one flow corresponding to the next 'SEQ_NUMBER' parameter value to be performed.

If it is determined that SLA measurement for all the flows has been completed in the current loop, in operation 1616, then the session manager determines whether SLA measurement for all the flows has been completed as many times as set by the 'NUMBER_OF_LOOP' parameter value obtained from the test condition per flow. If it is determined that SLA measurement for all the flows has not been completed as many times as the total number, in operation 1618, then the session manager waits until expiration of the time set by the 'LOOP_INTERVAL' parameter value. After that, the session manger returns to operation 1600 to instruct SLA measurement per flow to be performed in the next loop.

If it is determined that SLA measurement for all the flows has been completed as many times as the total number, then the session manager stops managing and controlling SLA measurement for multiple flows. Although not shown in FIG. 16, in an embodiment of the present disclosure, whenever an end point performing SLA measurement for a particular flow negotiates TCP and UDP session setup and test condition, transmits and/or receives a test packet, performs periodic analysis on test results received from the other end point, and outputs final SLA measurement results, then the end point immediately outputs the current state and corresponding SLA metrics to a shared memory.

According to an embodiment of the present disclosure, a method and apparatus for measuring and managing end-to-end SLA or at least one SLA of multiple flows in a network formed of homogeneous mobile network entities is provided, which may be applied regardless of any standards of mobile communication networks and may be universally applicable to equipment and elements of homogeneous networks. Furthermore, with measurement metrics set based on predetermined test conditions, disorders of an end-to-end network may be diagnosed in real time and quality analysis may be achieved on the level of service user.

While the present disclosure has been shown and described with reference to various embodiments thereof, it will be understand by those skilled in the art that various changes in form and details may be made therein without departing from the spirit and the scope of the present disclosure as defined by the appended claims and their equivalents.

What is claimed is:

1. A method for measuring a service quality in a heterogeneous network, the method comprising:
   sending, to a server, a test condition including one or more metric for service quality measurement of mobile communication entities included in the heterogeneous network;
   sending, to the server, a test packet;
   obtaining, from a test result received from the server, parameter values for the one or more metric;
   generating analysis data based on the parameter values for the one or more metric; and
   sending the analysis data, to a manager unit for the entities, based on the test condition.

2. The method of claim 1, wherein the one or more metric includes at least one of a first metric, a second metric and a third metric,
   wherein the first metric comprises one of counts of transmission or reception packets, and sums of the transmission or reception packets,
   wherein the second metric comprises one of throughputs, delays, jitters, packet losses, reordering, and
   wherein the third metric comprises one of a score for distinguishing voice quality, an R (resistance)-Factor, availability, and connectivity.

3. The method of claim 1, wherein if a parameter indicating periodic analysis is included in the parameter values, the generating of the analysis data comprises performing analysis on data results received from the server at an predetermined interval.

4. The method of claim 1, wherein the generating of analysis data comprises:
   setting a critical value for each of the one or more metric;
   comparing a parameter value for each of the one or more metric with a critical value for each of the one or more metric; and
   generating an alarm message indicating that there is a disorder in a flow with the server based on the comparison result.

5. The method of claim 1, further comprising sending the test condition for the service quality measurement to multiple servers,
   wherein the test condition further comprises information for controlling the service quality measurement for a flow with each of the multiple servers.

6. The method of claim 5, wherein the sending of the test packet comprises storing a state in a shared memory, the state indicating that the test packet is sent at a corresponding time,
   wherein the obtaining of the parameter values comprises storing the parameter values in the shared memory at a corresponding time; and
   wherein the generating of the analysis data comprises storing an alarm for any of the one or more metric in the shared memory in a corresponding time if the alarm is generated for the metric.

7. The method of claim 6, wherein the information for controlling the service quality measurement of a flow with each of the multiple servers comprises at least one of information indicating flows subject to service quality measurement simultaneously, information indicating an interval of the service quality measurement among the flows, and information indicating the number of performing the service quality measurement for the flows.

8. A method for measuring a service quality in a heterogeneous network, the method comprising:
   receiving, from a client, a test packet for service quality measurement of mobile communication entities included in the heterogeneous network;
   measuring parameter values for one or more metric, the one or more metric being included in a test condition received from the client in advance; and
   sending, to the client, a test result that includes the parameter values for the one or more metric.

9. The method of claim 8, wherein the one or more metric includes at least one of a first metric, a second metric and a third metric,
   wherein the first metric comprises one of counts of transmission or reception packets, and sums of the transmission or reception packets,
   wherein the second metric comprises one of throughputs, delays, jitters, packet losses, reordering, and
   wherein the third metric comprises one of a score for distinguishing voice quality, an R (resistance)-Factor, availability, and connectivity.

10. The method of claim 8, wherein the sending, to the client, the test result comprises sending the test result to the client at a time corresponding to a transmission time included in the test condition.

11. An apparatus for measuring a service quality in a heterogeneous network, the apparatus comprising:
   a transmitter configured to send a test packet to a server;
   a session controller configured to control the transmitter to send a test condition including one or more metric for service quality measurement of mobile communication entities included in the heterogeneous network to the server;
   a data analyzer configured to obtain, from a test result received from the server, parameter values for one or more metric, and configured to generate analysis data based on the parameter values for one or more metric; and a data output unit configured to send the analysis data to a manager unit for the entities based on the test condition.

12. The apparatus of claim 11, wherein the one or more metric includes at least one of a first metric, a second metric and a third metric,
wherein the first metric comprises one of counts of transmission or reception packets, and sums of the transmission or reception packets,
wherein the second metric comprises one of throughputs, delays, jitters, packet losses, reordering, and
wherein the third metric comprises one of a score for distinguishing voice quality, an R (resistance)-Factor, availability, and connectivity.

13. The apparatus of claim 11, wherein if a parameter indicating periodic analysis is included in parameter values, the data analyzer is configured to perform analysis on data results received from the server at an predetermined interval.

14. The apparatus of claim 11, wherein the data analyzer is configured to set a critical value for each of the one or more metric,
wherein the data analyzer is configured to compare a parameter value for each of the one or more metric with a critical value for each of the one or more metric and
wherein the data analyzer is configured to generate an alarm message indicating that there is a disorder in a flow with the server based on the comparison result.

15. The apparatus of claim 11, wherein the session controller is configured to control the transmitter to send the test condition for the service quality measurement to multiple servers,
wherein the test condition further comprises information for controlling the service quality measurement for a flow with each of the multiple servers.

16. The apparatus of claim 15, wherein the session controller is configured to store a state in a shared memory, the state indicating that the test packet is sent at a corresponding time, when the transmitter sends the test packet,
wherein the session controller is configured to stores parameter values in the shared memory at a corresponding time, when obtaining the parameter values, and
wherein the session controller is configured to generate analysis data by storing an alarm for any of the one or more metric in the shared memory in a corresponding time if the alarm is generated for the metric.

17. The apparatus of claim 16, wherein the information for controlling the service quality measurement of a flow with each of the multiple servers comprises at least one of information indicating flows subject to the service quality measurement simultaneously, information indicating an interval of the service quality measurement among the flows, and information indicating the number of performing the service quality measurement for the flows.

18. An apparatus for measuring a service quality in a heterogeneous network, the apparatus comprising:
a receiver configured to receive, from a client, a test packet for service quality measurement of mobile communication entities included in the heterogeneous network from a client;
a measuring unit configured to measure parameter values for one or more metric, the one or more metric being included in a test condition received from the client in advance, and
a transmitter configured to send the client a test result that includes the parameter values for the one or more metric.

19. The apparatus of claim 18, wherein the one or more metric includes at least one of a first metric, a second metric and a third metric,
wherein the first metric comprises one of counts of transmission or reception packets, and sums of the transmission or reception packets,
wherein the second metric comprises one of throughputs, delays, jitters, packet losses, reordering, and
wherein the third metric comprises one of a score for distinguishing voice quality, an R (resistance)-Factor, availability, and connectivity.

20. The apparatus of claim 18, wherein the transmitter is configured to send the test result to the client at a time corresponding to a transmission time included in the test condition.

* * * * *